(12) United States Patent
Wilson et al.

(10) Patent No.: US 10,967,925 B2
(45) Date of Patent: Apr. 6, 2021

(54) MOUNTABLE CLEAT APPARATUS

(71) Applicant: PRO-LYNX INC., Hillsburgh (CA)

(72) Inventors: Richard T. W. Wilson, Hillsburgh (CA); Jonathan J. H. G. Oskam, Guelph (CA)

(73) Assignee: PRO-LYNX INC., Erin (CA)

( * ) Notice: Subject to any disclaimer, the term of this patent is extended or adjusted under 35 U.S.C. 154(b) by 236 days.

(21) Appl. No.: 15/971,128

(22) Filed: May 4, 2018

(65) Prior Publication Data
US 2018/0319450 A1 Nov. 8, 2018

Related U.S. Application Data

(60) Provisional application No. 62/501,627, filed on May 4, 2017.

(51) Int. Cl.
*B62D 55/28* (2006.01)
*B60C 27/20* (2006.01)
*B62D 55/24* (2006.01)

(52) U.S. Cl.
CPC .............. *B62D 55/28* (2013.01); *B60C 27/20* (2013.01); *B62D 55/286* (2013.01); *B62D 55/24* (2013.01)

(58) Field of Classification Search
CPC ...... B62D 55/28; B62D 55/283; B62D 55/26; B62D 55/275; B60B 15/00; B60B 15/18; B60C 27/04; B60C 27/02; B60C 27/20
See application file for complete search history.

(56) References Cited

U.S. PATENT DOCUMENTS

| | | | | | |
|---|---|---|---|---|---|
| 1,395,134 | A | * | 10/1921 | Messner | B60B 15/00 301/44.1 |
| 2,701,169 | A | * | 2/1955 | Cannon | B62D 55/27 305/191 |
| 5,769,511 | A | * | 6/1998 | Hattori | B62D 55/275 305/189 |
| 6,557,954 | B1 | * | 5/2003 | Hattori | B62D 55/275 305/187 |
| 7,901,015 | B1 | * | 3/2011 | Anderson | B62D 55/28 152/225 C |
| 8,672,064 | B2 | * | 3/2014 | Korus | B62D 55/04 180/9.26 |
| 9,260,145 | B2 | * | 2/2016 | Korus | B62D 55/04 |

* cited by examiner

*Primary Examiner* — Jason R Bellinger

(57) ABSTRACT

There is disclosed a cleat apparatus mountable on a track of a tractor or similar vehicle. In an embodiment, the apparatus comprises an elongate frame having a first mounting bracket at a first end of the elongate frame, the first mounting bracket adapted to latch onto a first side of a track, and a removable second mounting bracket adapted to mount to a second end of the elongate frame, and to latch onto a second side of the track. The cleat apparatus is secured in position by the mounting brackets to provide additional traction for the track in more extreme operating conditions, including snow and ice in winter. This may significantly extend the utility of tractors which otherwise may sit idle during winter months.

12 Claims, 5 Drawing Sheets

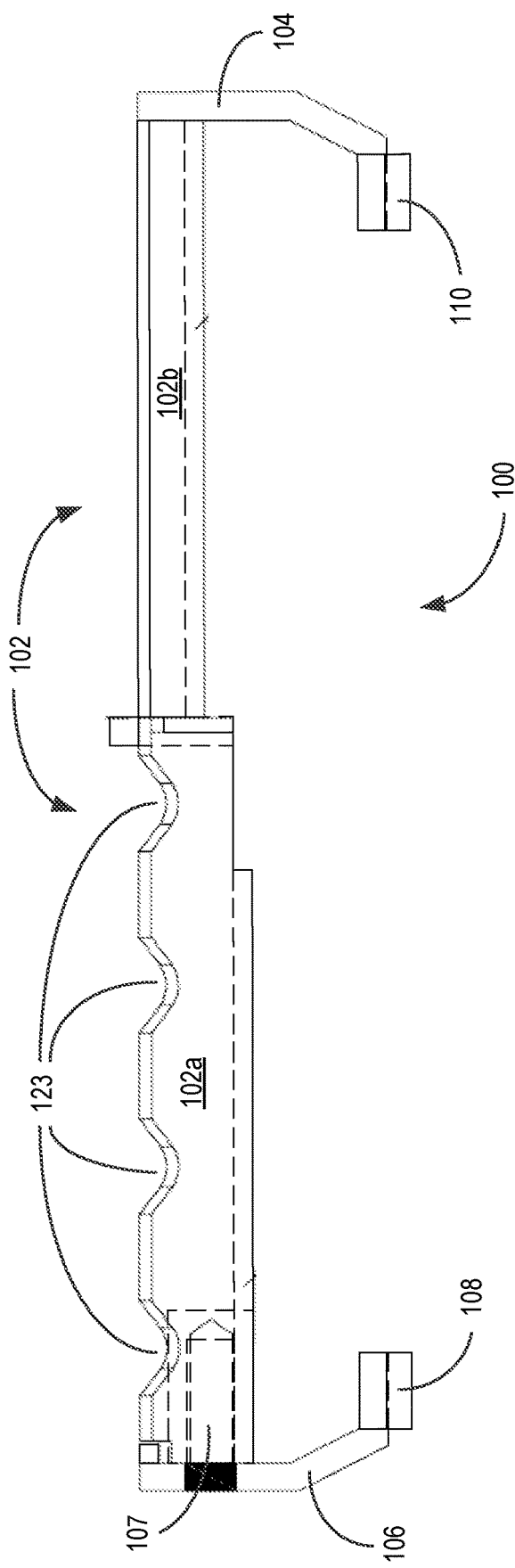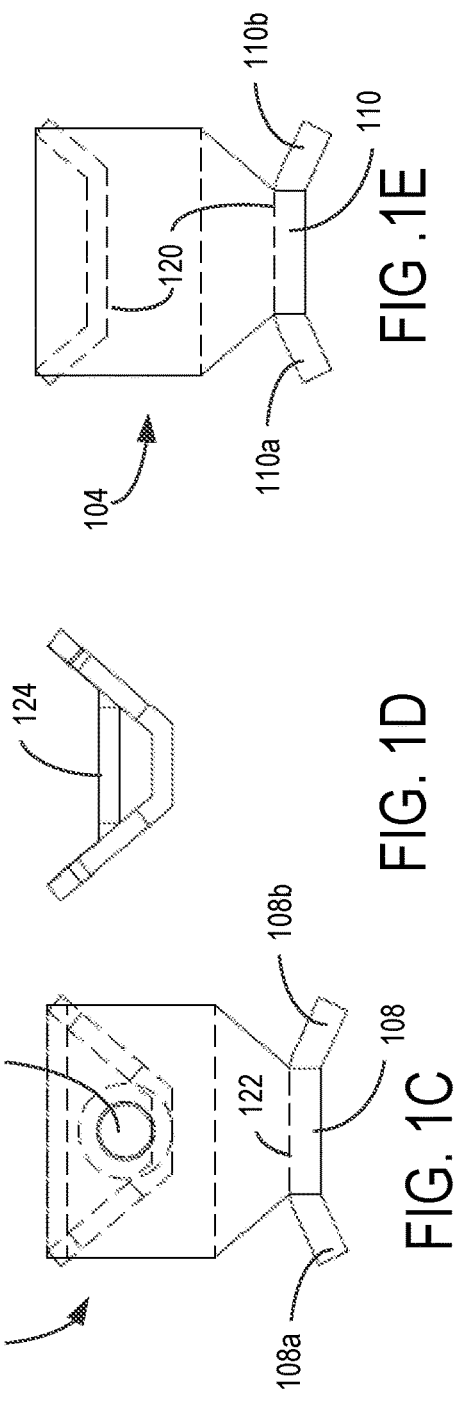

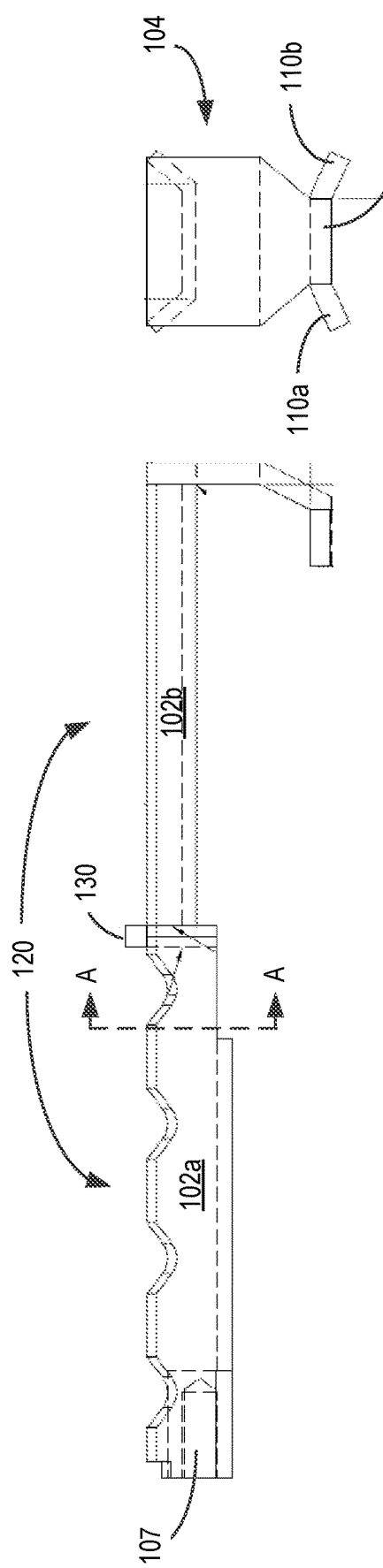
FIG. 2A
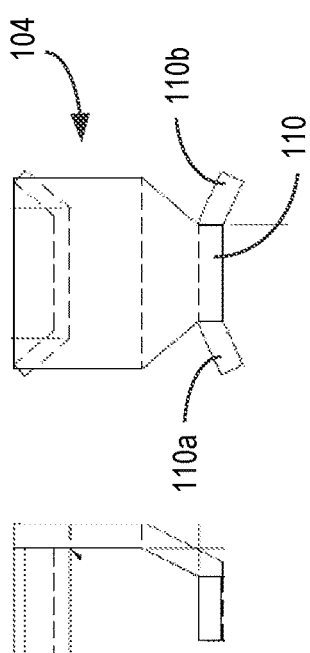
FIG. 2B
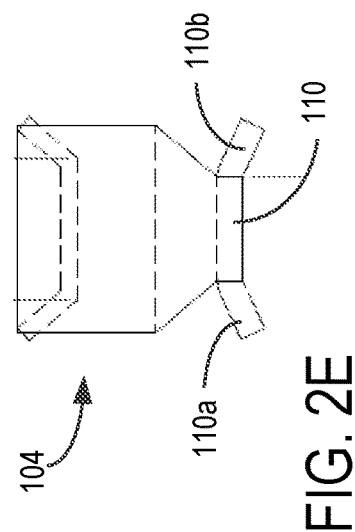
FIG. 2E
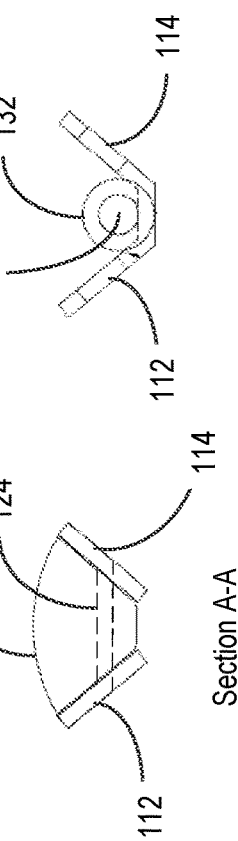
FIG. 2C
FIG. 2D

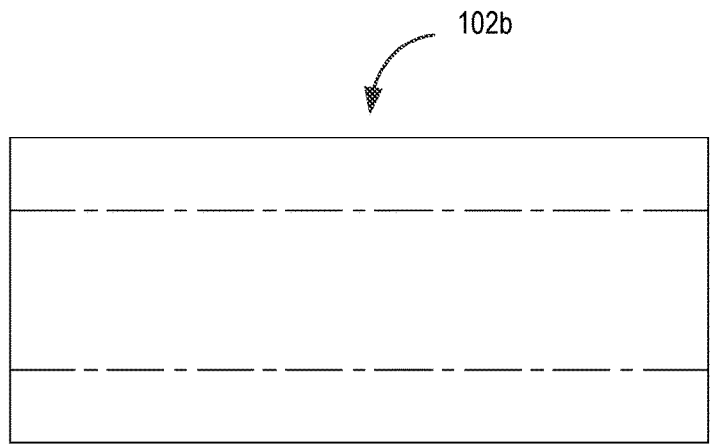
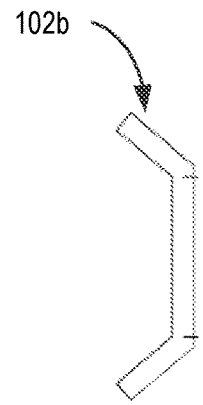
FIG. 3A  FIG. 3B
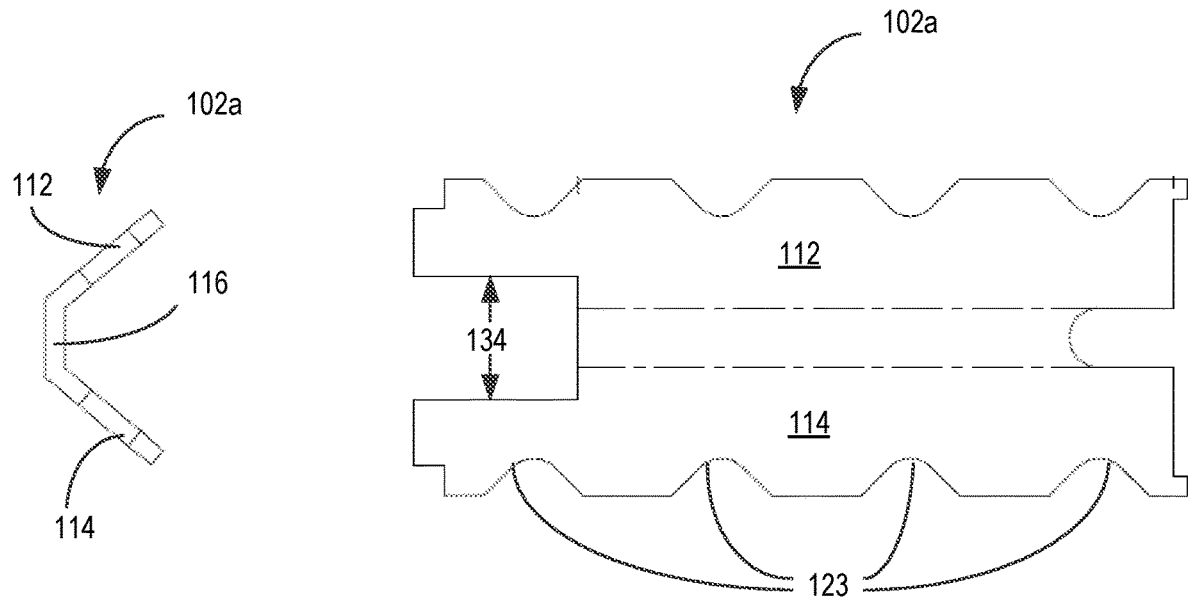
FIG. 3C  FIG. 3D

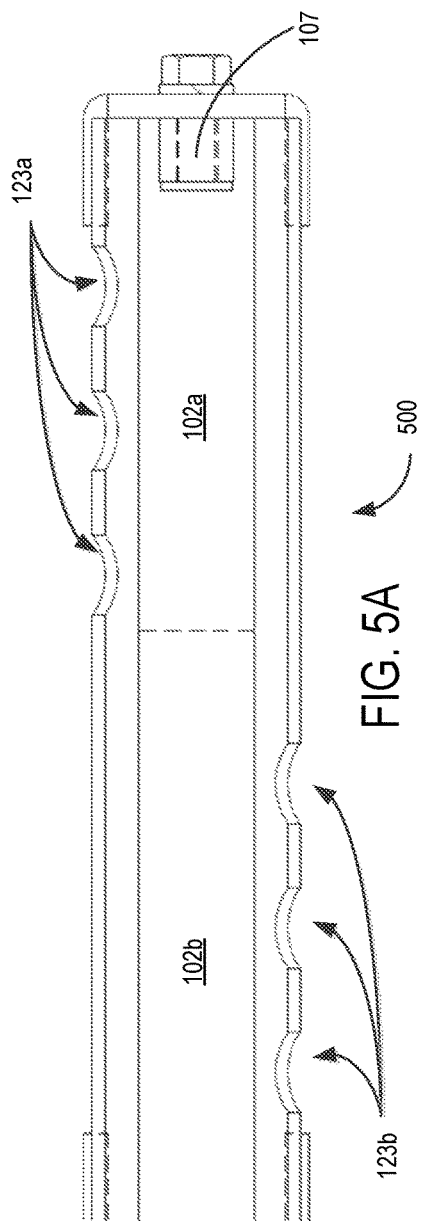
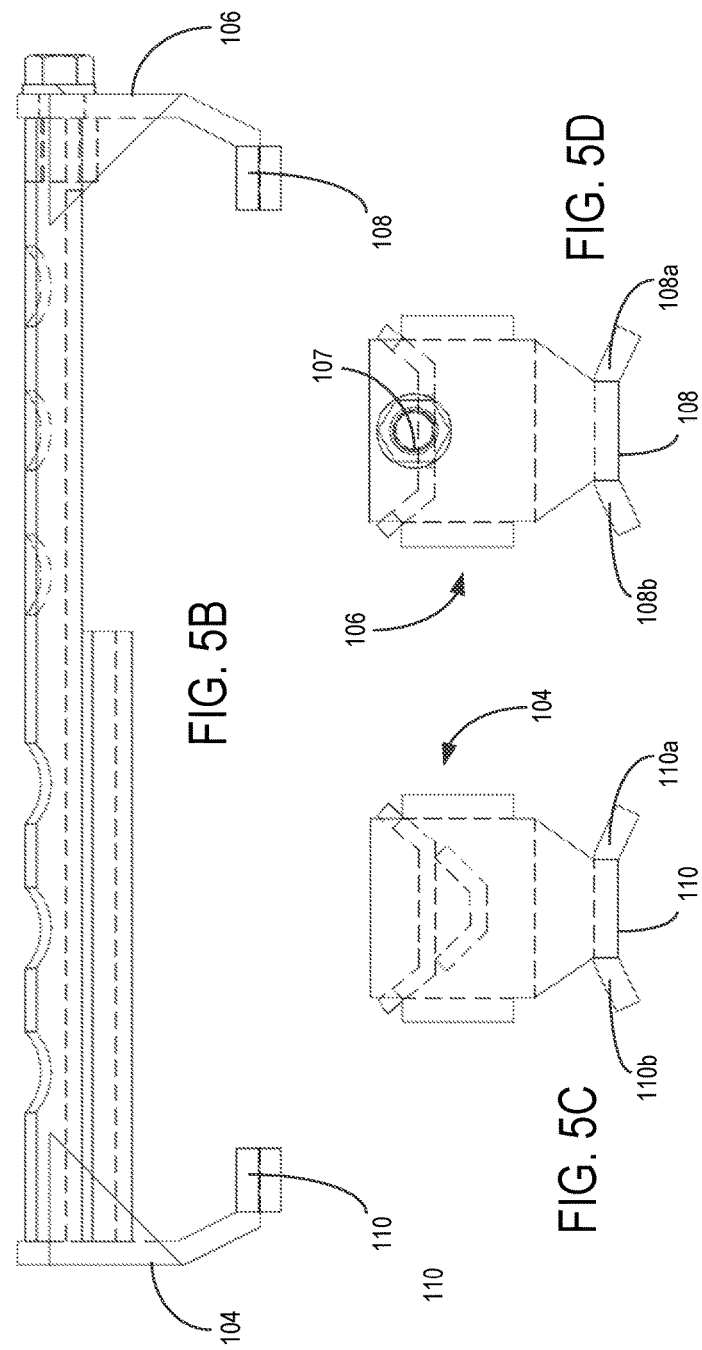
FIG. 5A
FIG. 5B
FIG. 5C
FIG. 5D

MOUNTABLE CLEAT APPARATUS

FIELD OF THE INVENTION

The present invention relates generally to a cleat apparatus adapted to be mountable to tracks of a tractor or similar vehicle.

BACKGROUND

Various types of tractors for use in construction, trenching, landscaping, material handling, and farming often have tracks that are optimized for use on various types of soil, ground surfaces, and roads. While these tractors are suitable for use in work environments and on soil, ground surface and road types for which they were designed, they are not suitable for use in harsher environments, such as winter conditions with snow and ice, as the tracks may lack sufficient traction, particularly on uphill or downhill grades. Consequently, many tractors simply sit idle over the winter months.

What is needed is an improved design for providing traction which addresses at least some of the limitations and drawbacks in the prior art.

SUMMARY

The present invention relates to a cleat apparatus adapted to be mountable to existing tracks on various types of tractors or similar vehicles used in construction, trenching, landscaping, material handling, and farming, such that the tractors can be repurposed for winter conditions with snow and ice. The cleat apparatus is suitable for various types of continuous tracks, including tracks made of formulated natural or synthetic rubber compounds, or other types of materials.

In an aspect, the mountable cleat apparatus comprises an elongate frame having a first mounting bracket at a first end of the elongate frame. The first mounting bracket is adapted to latch onto one side of a track. A removable second mounting bracket at a second end of the elongate frame is adapted to mount the cleat apparatus onto another side of a track with a securing mechanism. Both mounting brackets are adapted to extend over opposite sides of a track, and include flanges extending inwardly under at least an edge of the tracks, so as to allow the cleat apparatus to be secured in position. The first mounting bracket may be formed by an integrated bent portion at a first end of the elongate frame, or may be fastened using fasteners or permanently welded onto the first end of the elongate frame.

In an embodiment, the elongate frame is shaped to have a concave profile with angled side walls generally forming a "V" shape. The angle formed by the sidewalls of the elongate frame may be adapted to match the profile of a lateral groove or indent on the track to which the cleat apparatus is to be mounted. A valley floor formed between the sidewalls may also be adapted to match a profile of the lateral groove or indent on the track to which the cleat apparatus is to be mounted.

In another embodiment, the portion of the flanges extending inwardly under at least an edge of the tracks further include side flanges which extend laterally to either side of the inwardly extending flanges. These smaller side flanges may be angled so as to form a narrower mid-portion between the inwardly extending flange and the bottom of the elongate frame. This narrower mid-portion is centered at a lateral groove or indent on the track, and prevents the cleat from moving side-to-side within the lateral groove or indent on the track.

In another embodiment, the angled walls may further include notches along at least a portion of the length of the walls, so as to provide traction in a lateral direction.

In another embodiment, the elongate frame may have different profiles at different segments of its length, so as to provide different shapes of cleats along its length. These different profiles may be welded together.

In an embodiment, the securing mechanism may be a threaded mounting bolt adapted to mount the removable second mounting bracket onto the second end of the elongate frame.

The second end of the elongate frame includes a corresponding threaded mounting hole to receive the threaded mounting bolt. In an embodiment, the threaded mounting hole may be formed in a cylindrically shaped tube which is welded to the second end of the elongate frame, and positioned to receive the threaded mounting bolt in order to align the removable second mounting bracket at the second end.

In an embodiment, the length of the elongate frame is adjustable by means of the threaded mounting bolt, and how far it is screwed into the corresponding threaded mounting hole. This adjustability allows the cleat apparatus to be securely mounted to opposite sides of a track, even if there is some variability in the width of the track.

Preferably, a plurality of mountable cleats are mounted at regular intervals along the entire length of a track, on both sides of a tractor, so as to provide traction in harsher conditions, such as snow and ice. This allows the tractor to be repurposed for use in winter, allowing the operator to make use of the tractor year round. As the cleats are easily mountable and removable with the tracks still installed, a tractor can be converted to/from winter use conveniently and easily.

In this respect, before explaining at least one embodiment of the invention in detail, it is to be understood that the invention is not limited in its applications to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIGS. 1A to 1E show a mountable cleat apparatus in accordance with a first illustrative embodiment.

FIGS. 2A to 2E show a mountable cleat apparatus in accordance with another illustrative embodiment.

FIGS. 3A to 3D show detailed top views and end views of different sections of a mountable cleat apparatus in accordance with illustrative embodiments.

FIGS. 5A to 5D show a mountable cleat apparatus in accordance with another illustrative embodiment.

DETAILED DESCRIPTION

Figure 4A:
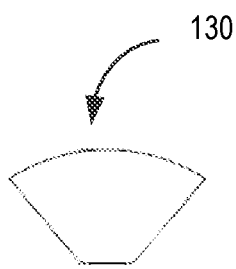
FIGS. 4A to 4F show detailed views of mounting brackets, mounting holes and braces in accordance with illustrative embodiments.

As noted above, the present invention relates to a cleat apparatus adapted to be mountable to existing tracks on various types of tractors or similar vehicles used in construction, trenching, landscaping, material handling, and farming, such that the tractors can be repurposed for winter conditions with snow and ice.

Various illustrative embodiments will now be described with reference to the drawings.

Referring to FIGS. 1A to 1E, shown a mountable cleat apparatus in accordance with a first illustrative embodiment. More particularly, FIG. 1A shows a side view of an entire length of a mountable cleat apparatus 100. In this illustrative embodiment, the mountable cleat apparatus 100 comprises an elongate frame 102 having an integrated mounting bracket 104 at a first end of the elongate frame 102 adapted to latch onto one side of a track (not shown), and a removable second mounting bracket 106 adapted to mount to the second end of the elongate frame 102 with a securing mechanism, such as a threaded mounting bolt (not shown) threaded into a corresponding threaded mounting hole 107. The mounting brackets 104, 106 are adapted to extend over the sides of a track, and include flanges 108, 110 extending inwardly under at least an edge of the tracks, so as to allow the cleat apparatus 100 to be secured in position on the tracks. As described in more detail further below, the integrated mounting bracket 104 may be formed by a bent portion at a first end of the elongate frame, or may be fastened using fasteners or permanently welded onto the first end of the elongate frame 102.

In an embodiment, as shown in FIG. 1B, the elongate frame 102 is shaped to have a channel profile with angled side walls 112, 114 generally forming a "V" shape. The angle formed by the sidewalls 112, 114 may be adapted to match the profile of a lateral groove or indent on the track to which the cleat apparatus is to be mounted.

A valley floor 116 formed between the sidewalls 112, 114 may also be adapted to match a profile of the lateral groove or indent on the track.

In another embodiment, the inwardly extending flanges 108, 110 further include side flanges 108a, 108b, 110a, 110b which extend laterally to either side of the inwardly extending flanges 108 and 110, respectively. These smaller side flanges 108a, 108b, 110a, 110b may be angled so as to form a narrower mid-section 120 between the inwardly extending flange 110 and the bottom of the elongate frame. This narrower mid-section 120 is centered at a lateral groove or indent on a track, and prevents the cleat from moving side-to-side within the lateral groove or indent on the track. A corresponding narrower mid-section 122 is also formed on the removable second mounting bracket 106 for the same purpose.

In another embodiment, the angled walls 112, 114 allow may further include notches 123 along at least a portion 102a of the length of the walls 112, 114, so as to provide traction in a lateral direction. As shown in this illustrative example, the notches may be generally "V" shaped to form a jagged appearance.

In another embodiment, the elongate frame 102 may have different cross-sectional profiles at different segments of its length, e.g. segments 102a and 102b, so as to provide different shapes of cleats along its length. These different segment profiles may be welded together at a join which may include a cross-brace 124 as shown in FIG. 1D.

As noted, in an embodiment, the securing mechanism may be a threaded mounting bolt (not shown) adapted to mount the removable second mounting bracket 106 onto the second end of the elongate frame 102.

The second end of the elongate frame 102 includes a corresponding threaded mounting hole 107 adapted to receive the threaded mounting bolt. In an embodiment, the threaded mounting hole 107 may be welded to the second end of the elongate frame 102, and positioned to receive the threaded mounting bolt in order to align the removable second mounting bracket 106 at the second end.

In an embodiment, the length of the elongate frame 102 is adjustable by means of the threaded mounting bolt, and how far it is screwed into the threaded mounting hole 107. This adjustability allows the cleat apparatus 100 to be securely mounted to either side of a track even if there is some variability in the width of the track. As well, this allows the cleat apparatus 100 to be re-tightened after it becomes loose under some use.

Preferably, a mountable tractor apparatus is mounted at regular intervals along the entire length of a track, on both sides of a tractor, so as to provide traction in harsher surface conditions, such as in snow and ice, particularly going uphill or downhill on graded surfaces.

Now referring to FIGS. 2A to 2E, shown is a mountable cleat apparatus in accordance with another illustrative embodiment. Like parts are shown with the same reference numerals as in FIGS. 1A to 1E.

As shown in Section A-A of FIG. 2C, where different segments 102a, 102b of the elongate frame 102 are joined, a brace 130 may be used to maintain the shape of the elongate frame at a mid-point. The brace 130 may be welded to one or both segments 102a, 102b. As will be appreciated, for elongate frames that have a longer length, or multiple different segment transitions, more than one brace, or more than one type of brace, may be used to provide additional structural strength.

In an embodiment, as shown in FIG. 2D, the threaded mounting hole 107 may be formed from a cylindrical tube 132 that is seated in a cutout section (see 134 in FIG. 3D) of the elongate frame 102. The cylindrical tube 132 may be welded onto the elongate frame along its length on either side of the cutout 134 to secure the cylindrical tube 132 in position. The cutout section 134 also allows the cylindrical tube 132 to sit low and flush with the bottom of the valley formed by the side walls 112, 114, so that the cylindrical tube stays out of the way while the cleat apparatus 100 is in operation.

FIGS. 3A to 3D show detailed top views and end views of different sections of a cleat apparatus 100 in accordance with illustrative embodiments. More particularly, FIGS. 3A and 3B show a top view and a side view of segment 102b of the elongate frame 102. Segment 102b may be formed, for example, from a metal plate from which walls are bent upwardly on either side to form a shallow channel, as shown in FIG. 3B.

FIGS. 3A and 3D show corresponding side and top views of segment 102a of elongate frame 102. This segment 102a may also be formed, for example, from a metal plate from which walls are bent upwardly on either side to form a generally V-shaped channel. As previously noted, a cutout 134 may be formed in the plate in order to seat a cylinder shaped, threaded mounting hole, which may be secured in position be welding the cylinder along either side of the cutout 134.

Still referring to FIG. 3D, notches 123 may be formed on other wall 112, 114 in order to provide lateral traction.

Now referring to FIGS. 4A to 4F, shown are detailed views of mounting brackets, mounting holes and braces in accordance with illustrative embodiments.

FIG. 4A shows an illustrative profile of a brace for joining two sections of the elongate frame 102. The brace may be shaped and sized to provide additional bracing points along the length of a segment.

Figure 4B:
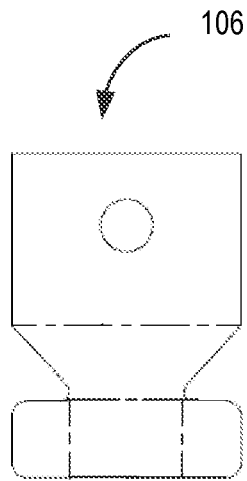

FIG. 4B shows an illustrative plate cutout from which a removable second mounting bracket 106 may be formed. Stippled lines show where the plate may be bent in order to form the final shape of the removable second mounting bracket 106 as shown in FIG. 1A and FIG. 1C.

Figure 4C:
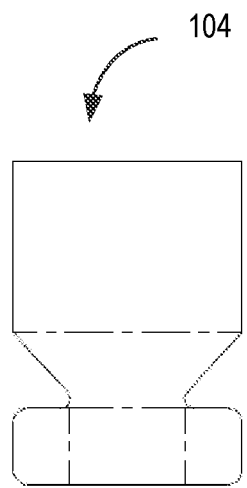

FIG. 4C shows an illustrative plate cutout from which a first mounting bracket 104 may be formed. Stippled lines show where the plate may be bent in order to form the final shape of the integrated first mounting bracket 104 as shown in FIGS. 1A and 1E.

Figure 4D:
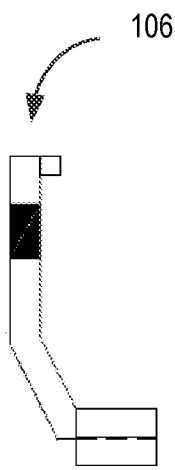

FIG. 4D shows a side view of the removable second mounting bracket 106 after the mounting bracket 106 has been bent into shape.

Figure 4E:
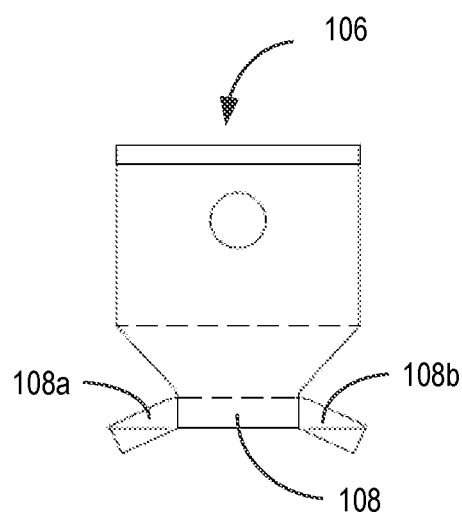
Figure 4F:
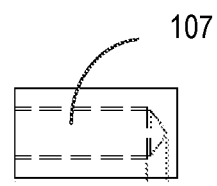

FIG. 4E shows a rear view of the removable second mounting bracket 106 corresponding to FIG. 4C.

Now referring to FIG. 5A, shown is a mountable cleat apparatus 500 in accordance with another illustrative embodiment. In FIG. 5A, parts corresponding to the parts previously described with reference to FIG. 1A are labeled the same. However, in this embodiment, the two sections 102a, 102b of the elongate frame 102 have notches 123a, 123b on opposite sides of the walls in their respective sections. This arrangement allows the cleat to provide similar tracking performance whether in a forward direction or a reverse direction.

Furthermore, as shown in FIGS. 5B to 5D, the angled side walls are shorter, thus forming a shallower channel profile which is customized for a different type of track. Otherwise, the function of the mounting brackets 104, 106 and the flanges 108, 110 are the same as discussed earlier with reference to FIG. 1A.

It will be appreciated that additional embodiments may be designed to fit different types of tracks, and therefore the dimensions of the various parts may vary in order for the cleat apparatus to provide a custom for a particular type or brand of track, whether made of a formulated natural or synthetic rubber compound, or another type of material.

In an embodiment, each part of the cleat apparatus 100 may be made of metal or composite materials of sufficient strength to carry the weight of the tractor without deformation. The parts may be bent, stamped, molded, machined or 3D-printed as required, and may be heat treated and cooled as necessary.

Advantageously, the mountable cleat apparatus 100 allows a tractor to be converted and repurposed for use in winter, thereby getting extended use of the tractor and avoiding unproductive idling. As the cleats are easily mountable and removable with the tracks still installed, a tractor can be converted to/from winter use by a tractor owner/operator conveniently and easily.

Thus, in an aspect, there is provided a cleat apparatus mountable on a track of a tractor, comprising: an elongate frame having a first mounting bracket at a first end of the elongate frame, the first mounting bracket adapted to latch onto a first side of a track; and a removable second mounting bracket adapted to mount to a second end of the elongate frame, and to latch onto a second side of the track; whereby, the cleat apparatus is secured in position by the mounting brackets to provide additional traction for the track.

In an embodiment, the elongate frame is shaped to have a concave profile with angled side walls generally forming a "V" shape.

In another embodiment, the angle formed by the sidewalls of the elongate frame are adapted to match a profile of a lateral groove or indent on a track to which the cleat apparatus is to be mounted.

In another embodiment, the valley floor formed between the sidewalls of the elongate frame is adapted to match the profile of the lateral groove or indent on the track to which the cleat apparatus is to be mounted.

In another embodiment, a height of the angled walls and the angle formed between the walls determine how far the cleat apparatus extends off of the track to which the cleat apparatus is to be mounted, and how much traction the cleat apparatus provides.

In another embodiment, the angled walls further include notches along at least a portion of the length of the walls, so as to provide traction in a lateral direction.

In another embodiment, the size and angle of the notches along at least a portion of the length of the walls determines how much lateral traction the cleat apparatus provides.

In another embodiment, the elongate frame has different profiles at different segments of its length, so as to provide different shapes of cleats along its length.

In another embodiment, the integrated mounting bracket and the removable second mounting bracket each include a flange extending inwardly under at least an edge of the track to which the cleat apparatus is to be mounted.

In another embodiment, the flanges extending inwardly under at least an edge of the tracks further include side flanges which extend laterally to either side of the inwardly extending flanges, these side flanges angled so as to form a narrow mid-portion between the inwardly extending flanges and a bottom of the elongate frame.

In another embodiment, the integrated mounting bracket is formed by a bent portion at the first end of the elongate frame.

In another embodiment, the integrated mounting bracket is welded onto the first end of the elongate frame.

In another embodiment, the removable second mounting bracket is adapted to be mounted to the second end of the elongate frame by a mounting bolt received in a corresponding mounting hole.

In another embodiment, the cleat apparatus further comprising a corresponding mounting hole to receive the mounting bolt, the mounting hole formed in a body which is welded to the second end of the elongate frame and positioned to receive the threaded mounting bolt to align the removable second mounting bracket at the second end.

In another embodiment, the length of the elongate frame is adjustable by how far the mounting bolt is mounted into the corresponding mounting hole.

In another embodiment, the mounting bolt and the corresponding mounting hole are threaded.

While various illustrative embodiments have been described above by way of example, it will be appreciated that various changes and modifications may be made without departing from the scope of the invention, which is defined by the following claims.

The invention claimed is:

1. A cleat apparatus mountable on a track of a vehicle, comprising:
   an elongate frame having a first mounting bracket at a first end of the elongate frame, the first mounting bracket adapted to latch onto a first side of a track; and
   a removable second mounting bracket adapted to mount to a second end of the elongate frame, and to latch onto a second side of the track;

whereby, the cleat apparatus is secured in position by the mounting brackets to provide additional traction for the track; and wherein the first and second mounting brackets include flanges extending inwardly under at least an edge of the tracks further include side flanges which extend laterally to either side of the inwardly extending flanges, these side flanges angled so as to form a mid-portion between the inwardly extending flanges and a bottom of the elongate frame.

2. The cleat apparatus of claim 1, wherein the elongate frame is shaped to have a concave profile with angled side walls generally forming a "V" shape.

3. The cleat apparatus of claim 2, wherein the angled walls further include notches along at least a portion of the length of the walls, so as to provide traction in a lateral direction.

4. The cleat apparatus of claim 3, wherein the size and angle of the notches determines how much lateral traction the cleat apparatus provides.

5. The cleat apparatus of claim 2, wherein the elongate frame has different profiles at different segments of the length of the frame, so as to provide different shapes of cleats along the length of the frame.

6. The cleat apparatus of claim 1, wherein the first mounting bracket and the removable second mounting bracket each include a flange extending inwardly under at least the edge of the track to which the cleat apparatus is to be mounted.

7. The cleat apparatus of claim 1, wherein the first mounting bracket is formed by a bent portion at the first end of the elongate frame.

8. The cleat apparatus of claim 1, wherein the first mounting bracket is welded onto the first end of the elongate frame.

9. The cleat apparatus of claim 1, wherein the removable second mounting bracket is adapted to be mounted to the second end of the elongate frame by a mounting bolt received in a corresponding mounting hole.

10. The cleat apparatus of claim 9, further comprising a corresponding mounting hole to receive the mounting bolt, the mounting hole formed in a body which is welded to the second end of the elongate frame and positioned to receive the threaded mounting bolt to align the removable second mounting bracket at the second end.

11. The cleat apparatus of claim 10, wherein the length of the elongate frame is adjustable by how far the mounting bolt is mounted into the corresponding mounting hole.

12. The cleat apparatus of claim 10, wherein the mounting bolt and the corresponding mounting hole are threaded.

* * * * *